Sept. 15, 1925.  
H. WEICHSEL  
ALTERNATING CURRENT MOTOR  
Filed Nov. 12, 1923

1,553,345

INVENTOR  
Hans Weichsel  
BY E. E. Huffman  
ATTORNEY

Patented Sept. 15, 1925.

1,553,345

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed November 12, 1923. Serial No. 674,131.

*To all whom it may concern:*

Be it known that I, HANS WEICHSEL, a citizen of the United States of America, residing at the city of St. Louis, State of Missouri, United States of America, have invented a certain new and useful Alternating-Current Motor, of which the following is such a full, clear, and exact description, as will enable any one skilled in the art to which it appertains to make and use the same, reference being had to the accompanying drawings, forming part of this specification.

Figure 1:
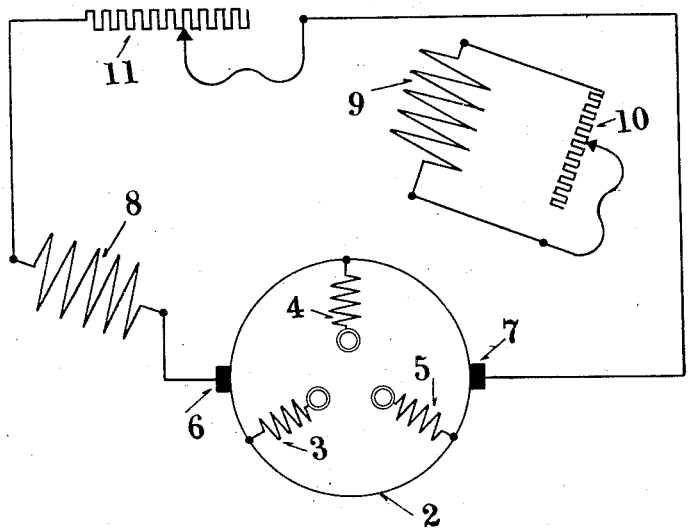
Figure 2:
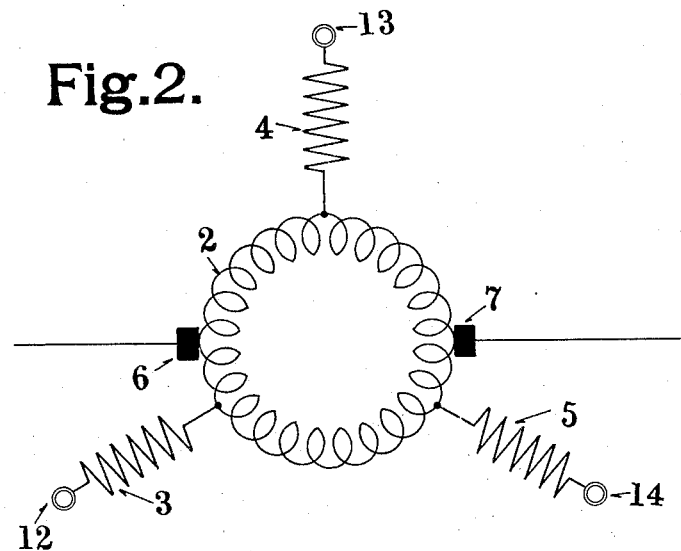

My invention relates to an alternating current motor capable of operating both as an induction and as a synchronous motor. Figure 1 is a diagrammatic representation of a two-pole polyphase motor embodying the invention, and Figure 2 more clearly represents the windings on the revolving member. My invention is applicable to single as well as to polyphase motors, but I will first describe it as applied to a polyphase machine.

I prefer to make use of a structure without defined polar projections on either member as is customary for single and polyphase induction motors, and while the primary member may be either stationary or revolving, I will describe my improvements as applied to a motor with a revolving primary. This revolving primary carries a commuted winding 2 combined and interconnected with a star connected polyphase winding, 3, 4, 5, the commuted winding 2 being located in the center or zero point of the star. This commuted winding can be looked upon as a delta connected three-phase winding located at the middle point of the star connected three-phase winding 3, 4, 5. Slip-rings 12, 13, 14 are attached to one end of each of the three phases of the star connected polyphase rotor winding, and provide the means for connecting the machine to the supply. Brushes 6, 7 cooperate with the commuted winding 2 by means of a commutator such as is usually used in connection with such windings, and these brushes are connected to a winding 8 located on the stator, the axis of this winding being displaced from the brush axis by a small angle. One value of this angle which I have found to give good results lies in the neighborhood of 20 electrical degrees. A regulating resistance 11 is included in the circuit of this winding 8.

The stator further carries a winding 9 displaced by 90 electrical degrees from the winding 8 and adapted to be closed over an adjustable resistance 10, all of which can, when desired, be cut out of circuit.

Referring to the operation of the motor shown in Figure 1, at starting a certain amount of resistance is included in the circuit of each of the stator windings 8 and 9, the former being left connected to the brushes 6, 7 and the slip-rings are connected to the supply. The two stator windings now do duty as polyphase secondary or induced windings and the machine starts with good torque and relatively small current. As the speed increases, the resistance in circuit with each of the two stator windings can be reduced in one or more steps until the winding 9 is short-circuited and the resistance of the circuit containing the winding 8 has been brought back to its operating value. As the speed increases, the induction motor torque of the machine decreases and becomes very small indeed, near synchronism, and is incapable of bringing the machine into synchronism. It is, however, desirable to cause the machine to run synchronously in normal operation for the reason that the power factor of such a motor can be readily adjusted if provision is made for producing a unidirectional excitation through the machine. In this case the unidirectional excitation is derived from the commuted winding 2, which, at synchronism, acts like a converter winding in a manner now well understood. The direct current derived from the winding 2 at synchronous speed is conducted through the stator winding 8 and the latter produces the desired unidirectional magnetization. But this winding 8, being so connected to the rotor that the E. M. F. induced therein and the E. M. F. conductively impressed thereon from the commutator are in such relative direction as to cooperate in producing current therein, also develops a synchronizing torque tending to pull the machine into synchronism. The smaller the angular displacement of the winding 8 from the brush axis the better the synchronizing torque, and by making this displacement less than 45 electrical degrees the winding both produces a good synchronizing torque and a unidirectional excitation in synchronous operation, one component of which is so located as to satisfactorily influence the power factor. I have found that angles from 10 to 30 electrical degrees give good results.

Should the machine at any time become overloaded when operating as a synchronous motor and fall out of step, it will continue to operate with good torque as an induction motor, the two stator windings 8 and 9 again doing duty as polyphase secondary or induced windings.

In order to secure the best utilization of the winding space on the rotor, and at the same time secure such a low voltage on the commutator as will permit of a sufficiently small number of turns per commutator bar to insure perfect commutation, I have combined the commuted winding 2 with the three-phase star winding 3, 4, 5, placing the former in the middle of the star. It will be understood that this commuted winding acts like the armature winding of an ordinary rotary converter and in order to take the fullest advantage of this condition, I prefer, whenever possible, to so select the constants of my machine as to make the unidirectional exciting current sent into the winding 8 under synchronous operation about equal to the alternating current sent into the rotor. Under these conditions, the copper losses in the commuted winding 2 will be equal to the corresponding losses of a fully loaded converter and consequently less than the losses which would result in this winding if it carried the direct current only or the alternating current without the direct current.

In applying these improvements to a single-phase motor, it is only necessary to remember that the armature reaction in the single-phase machine has one unidirectional component and another component of double frequency. The short-circuited winding 9 on the stator can damp out or eliminate this double frequency component, and the machine may be started in any well known manner applicable to the starting of single-phase motors.

Having fully described my invention, what I claim as new and desire to secure by Letters Patent of the United States is:

1. In a synchronous-induction motor, the combination of an inducing member provided with a commutator and brushes thereon, means for supplying alternating current to the inducing member, and an induced member having an exciting winding displaced by a small angle from the axis of said brushes, said angle being less than 45 electrical degrees.

2. In a synchronous-induction motor, the combination of an inducing member provided with a commutator and brushes thereon, means for supplying alternating current to the inducing member, an induced member having an exciting winding in circuit with the brushes and displaced by a small angle from the axis of said brushes, said angle being less than 45 electrical degrees, and a second winding on the induced member and displaced from the exciting winding.

3. In a synchronous-induction motor, the combination of an inducing member provided with a commutator and brushes thereon, means for supplying alternating current to the inducing member, an induced member having an exciting winding in circuit with the brushes and displaced by a small angle from the axis of said brushes, said angle being less than 45 electrical degrees, and a second winding on the induced member closed on itself and displaced from the exciting winding.

4. In a synchronous-induction motor, the combination of an inducing member provided with a commutator and brushes thereon, means for supplying alternating current to the inducing member, an induced member having an exciting winding in circuit with the brushes and displaced by a small angle from the axis of said brushes, said angle being less than 45 electrical degrees, a resistance in circuit with said exciting winding, and means for cutting out said resistance after the motor is started.

5. In a synchronous-induction motor, the combination of an inducing member provided with a commutator and brushes thereon, means for supplying alternating current to the inducing member, an induced member having an exciting winding in circuit with the brushes and displaced by a small angle from the axis of said brushes, said angle being less than 45 electrical degrees, a second winding on the induced member closed on itself and displaced from the exciting winding, a resistance in circuit with the exciting winding, and means for cutting out said resistance after the motor is started.

6. In a synchronous-induction motor, the combination of a rotor provided with a commutator and slip-rings, brushes on the commutator, a stator having an exciting winding displaced by a small angle from the axis of the brushes and in circuit therewith, said angle being less than 45 electrical degrees, a second winding on the stator closed on itself and displaced from the exciting winding, resistances in circuit with each of said stator windings, and means for cutting out said resistances after the motor is started.

7. In a synchronous-induction motor, the combination of a rotor provided with a commuted winding and a polyphase winding, said windings being interconnected, a commutator and slip-rings connected to the commuted and polyphase windings respectively, brushes on the commutator, a stator having an exciting winding in circuit with said brushes and displaced therefrom by an angle less than 45 electrical degrees, a second winding on the stator displaced from the exciting winding, resistances in circuit with each of said stator windings, and means for cutting out said resistances after the motor is started.

8. In a synchronous induction motor, the combination of an inducing member provided with a commutator and brushes thereon, means for supplying alternating current to the inducing member, and an induced member having an exciting winding in circuit with the brushes and displaced by more than 45 electrical degrees from that axis of the machine which is at right angles to the brush axis.

In testimony whereof, I have hereunto set my hand and affixed my seal.

HANS WEICHSEL.